(12) United States Patent
Griffin

(10) Patent No.: US 11,863,689 B1
(45) Date of Patent: *Jan. 2, 2024

(54) SECURITY SETTLEMENT USING GROUP SIGNATURES

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/972,394

(22) Filed: Oct. 24, 2022

Related U.S. Application Data

(63) Continuation of application No. 16/718,960, filed on Dec. 18, 2019, now Pat. No. 11,483,162.

(51) Int. Cl.
*H04L 9/32* (2006.01)

(52) U.S. Cl.
CPC .......... *H04L 9/3255* (2013.01); *H04L 9/3268* (2013.01)

(58) Field of Classification Search
CPC .............................. H04L 9/3255; H04L 9/3268
See application file for complete search history.

(56) References Cited

U.S. PATENT DOCUMENTS

| | | |
|---|---|---|
| 6,088,454 A | 7/2000 | Nagashima et al. |
| 7,028,180 B1 | 4/2006 | Aull et al. |
| 7,036,146 B1 | 4/2006 | Goldsmith |
| 7,234,059 B1 | 6/2007 | Beaver et al. |
| 7,346,171 B2 | 3/2008 | Numao et al. |
| 7,363,339 B2 | 4/2008 | Delany et al. |
| 7,472,277 B2 | 12/2008 | Halcrow et al. |
| 7,475,046 B1 | 1/2009 | Foley et al. |
| 7,533,270 B2 | 5/2009 | Gentry |
| 7,571,324 B2 | 8/2009 | Canard et al. |

(Continued)

FOREIGN PATENT DOCUMENTS

WO WO-2019/080933 A1 5/2019

OTHER PUBLICATIONS

Agarwal et al., "A Survey of Group Signature Technique, its Application and Attacks", International Journal of Engineering and Innovative Technology, vol. 2, Issue 10, Apr. 2013. 8 pages.

(Continued)

*Primary Examiner* — Noura Zoubair
*Assistant Examiner* — Zoha Piyadehghibi Tafaghodi
(74) *Attorney, Agent, or Firm* — Foley & Lardner LLP

(57) ABSTRACT

A system having one or more processors. The one or more processors receive data having a request for transferring ownership of a portion of a security from a first user computing system. A portion of the data is signed by a signer with a group signature having an extension. The one or more processors further receive a request to link an identity of the signer and open the identity of the signer. The one or more processors provide to a regulator information corresponding to the group signature and a signature of a transferee being linked to the group signature. The one or more processors generate signing ability of a second user computing system associated with an identifier of the transferee. Generating the signing ability of the second user computing system to use the group signature transfers the ownership of the portion of the security.

17 Claims, 4 Drawing Sheets

(56) References Cited

U.S. PATENT DOCUMENTS

| | | | |
|---|---|---|---|
| 7,904,722 B2 | 3/2011 | Sudia et al. | |
| 8,117,230 B2 | 2/2012 | Shaji et al. | |
| 8,245,047 B2 | 8/2012 | Zaccone et al. | |
| 8,346,668 B2 | 1/2013 | Fujita | |
| 8,397,291 B2 | 3/2013 | Miyazaki et al. | |
| 8,516,247 B2 | 8/2013 | Canard et al. | |
| 8,522,040 B2 | 8/2013 | Camenisch et al. | |
| 8,661,251 B2 | 2/2014 | Prouff et al. | |
| 8,689,000 B2 | 4/2014 | Chen et al. | |
| 8,838,984 B2 | 9/2014 | Aharonov et al. | |
| 8,874,769 B2 | 10/2014 | Mao et al. | |
| 8,977,661 B2 | 3/2015 | Cidon et al. | |
| 9,015,231 B1 | 4/2015 | Hodgman et al. | |
| 9,052,375 B2 | 6/2015 | Sampigethaya et al. | |
| 9,325,694 B2 | 4/2016 | Du et al. | |
| 9,860,069 B2 | 1/2018 | Patey et al. | |
| 9,954,684 B2 | 4/2018 | Popa et al. | |
| 9,973,342 B2 | 5/2018 | Lyubashevsky et al. | |
| 10,033,702 B2 | 7/2018 | Ford et al. | |
| 10,225,258 B2 | 3/2019 | Camenisch et al. | |
| 10,326,602 B2 | 6/2019 | Park et al. | |
| 2002/0007335 A1 | 1/2002 | Millard et al. | |
| 2002/0156719 A1 | 10/2002 | Finebaum et al. | |
| 2003/0195857 A1 | 10/2003 | Acquisti | |
| 2004/0078341 A1 | 4/2004 | Steichen | |
| 2004/0093493 A1 | 5/2004 | Bisbee et al. | |
| 2004/0128259 A1 | 7/2004 | Blakeley et al. | |
| 2006/0184666 A1 | 8/2006 | Nozawa et al. | |
| 2007/0104104 A1 | 5/2007 | Abu-Amara | |
| 2007/0255661 A1 | 11/2007 | Yoshida et al. | |
| 2008/0172559 A1 | 7/2008 | Yellepeddy | |
| 2008/0221945 A1 | 9/2008 | Pace et al. | |
| 2009/0089575 A1 | 4/2009 | Yonezawa et al. | |
| 2012/0017083 A1 | 1/2012 | Canard et al. | |
| 2012/0084567 A1 | 4/2012 | Hwang et al. | |
| 2012/0166808 A1 | 6/2012 | Hong et al. | |
| 2012/0303963 A1 | 11/2012 | Murao et al. | |
| 2014/0082365 A1* | 3/2014 | Everhart | H04L 9/3263 713/175 |
| 2016/0099814 A1 | 4/2016 | Negi et al. | |
| 2016/0330034 A1 | 11/2016 | Back et al. | |
| 2016/0335629 A1 | 11/2016 | Scott | |
| 2018/0006826 A1 | 1/2018 | Smith et al. | |
| 2018/0109516 A1 | 4/2018 | Song et al. | |
| 2018/0173747 A1 | 6/2018 | Baird, III | |
| 2018/0204191 A1 | 7/2018 | Wilson et al. | |
| 2018/0343126 A1 | 11/2018 | Fallah | |
| 2018/0352432 A1* | 12/2018 | Barki | H04L 9/3239 |
| 2018/0376318 A1 | 12/2018 | Wang et al. | |
| 2019/0028277 A1 | 1/2019 | Jayachandran et al. | |
| 2019/0043043 A1 | 2/2019 | Saraniecki et al. | |
| 2019/0044700 A1 | 2/2019 | Leddy | |
| 2019/0044734 A1 | 2/2019 | Lancashire et al. | |
| 2019/0087893 A1 | 3/2019 | Pellew | |
| 2019/0114706 A1 | 4/2019 | Bell et al. | |
| 2019/0132350 A1 | 5/2019 | Smith et al. | |
| 2019/0158298 A1 | 5/2019 | Muftic | |
| 2019/0273617 A1 | 9/2019 | Maher | |
| 2019/0312734 A1 | 10/2019 | Wentz et al. | |
| 2019/0356481 A1 | 11/2019 | Spector et al. | |

OTHER PUBLICATIONS

Emura et al., "An r-Hiding Revocable Group Signature Scheme: Group Signatures with the Property of Hiding the Number of Revoked Users", Hindawi Publishing Corporation, Journal of Applied Mathematics, vol. 2014, Article ID 983040, Published Jun. 1, 2014. 15 pages.

Katurde et al., "Secured Group Data Sharing in Cloud Computing", International Journal of Advanced Computational Engineering and Networking, vol. 7, Issue 7, Jul. 2019. 3 pages.

Kumar et al., "A Novel Technique for Data Sharing and Forwarding Through Cost Effective Identity Concept", IJCSEST, Sep. 2016 Issue. 7 pages.

Leshkowitz, Maya, "Group Signature Schemes with Distributed Traceability (or how to open a signature fairly", Jun. 22, 2018. 7 pages.

Li et al., "Hidden attribute-based signatures without anonymity revocation", Information Sciences 180 (2010) 1681-1689.

* cited by examiner

SECURITY SETTLEMENT USING GROUP SIGNATURES

CROSS-REFERENCE TO RELATED APPLICATIONS

This application is a continuation of U.S. patent application Ser. No. 16/718,960, filed Dec. 18, 2019, titled SECURITY SETTLEMENT USING GROUP SIGNATURES, which is incorporated herein by reference in its entirety and for all purposes.

BACKGROUND

Anonymous or partially anonymous requests for settling securities may be useful in a number of situations that benefit from the ability of a person or group to settle one or more securities. There are many different types of digital signature schemes and each type has its own characteristics, usage benefits, and drawbacks. Some of these schemes can be described as anonymous digital signature schemes and examples may include signatures associated with X.509 digital certificates and the SignedData type defined in the Cryptographic Message Syntax (CMS) standards widely used by businesses (X9.73), in the IETF to implement secure electronic mail, or X.894 that standardizes CMS for the telecommunications industry. Though anonymous digital signatures are known, there is now a renewed interest in their application to new and emerging technologies.

SUMMARY

Systems and methods are described that allow for settlement of securities without revealing ownership including the end owner. In some implementations, ownership or control of a security may be managed by using group membership technology to revoke the signing rights of the seller and adding signing rights to the buyer. Group membership with group signatures allow for one group public key and a plurality of private keys, where each private key is associated with a group member. Signatures create by different group members are indistinguishable to verifiers but a group manager is able to determine which member has signed, link member signatures, implement controls and/or limits, and revoke and add signatory capability when needed. In some implementations, revocation of signatory capability is done with the cooperation of a Digital Certificate Authority.

Systems and methods are described to leverage group signature technology to allow a group manager to settle one or more securities. In some instances, this allows for control of a security associated with a group signature by members of a group using the group signature. Membership in the group without a status of membership being revoked gives ownership and/or control of the security.

Various implementations relate to a security settlement system having one or more processors. The one or more processors receive data having a request for transferring ownership of a portion of a security from a first user computing system. A portion of the data is signed by a signer with a group signature. The group signature includes an extension. The extension links an identity of the signer. The one or more processors further receive a request to link the identity of the signer from a regulator through the extension and open the identity of the signer. The one or more processors provide to the regulator information corresponding to the group signature and a signature of a transferee being linked to the group signature. The one or more processors generate signing ability of a second user computing system associated with an identifier of the transferee. Generating the signing ability of the second user computing system to use the group signature transfers the ownership of the portion of the security.

Various implementations relate to a method executed on a security settlement system. The method includes receiving data having a request for transferring ownership of a portion of a security from a first user computing system. A portion of the data is signed by a signer with a group signature. The group signature includes an extension. The extension links an identity of the signer. The method further includes receiving a request to link the identity of the signer from a regulator through the extension and opening the identity of the signer. The method further includes providing to the regulator information corresponding to the group signature and a signature of a transferee being linked to the group signature. The method further includes generating signing ability of a second user computing system associated with an identifier of the transferee. Generating the signing ability of the second user computing system to use the group signature transfers the ownership of the portion of the security.

Various implementations relate to a non-transitory computer-readable storage media storing instructions that are executable by one or more processors to perform operations. The operations include receiving data having a request for transferring ownership of a portion of a security from a first user computing system. A portion of the data is signed by a signer with a group signature. The group signature includes an extension. The extension links an identity of the signer. The operations further include receiving a request to link the identity of the signer from a regulator through the extension and opening the identity of the signer. The operations further include providing to the regulator information corresponding to the group signature and a signature of a transferee being linked to the group signature. The operations further include generating signing ability of a second user computing system associated with an identifier of the transferee. Generating the signing ability of the second user computing system to use the group signature transfers the ownership of at least the portion of the security.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
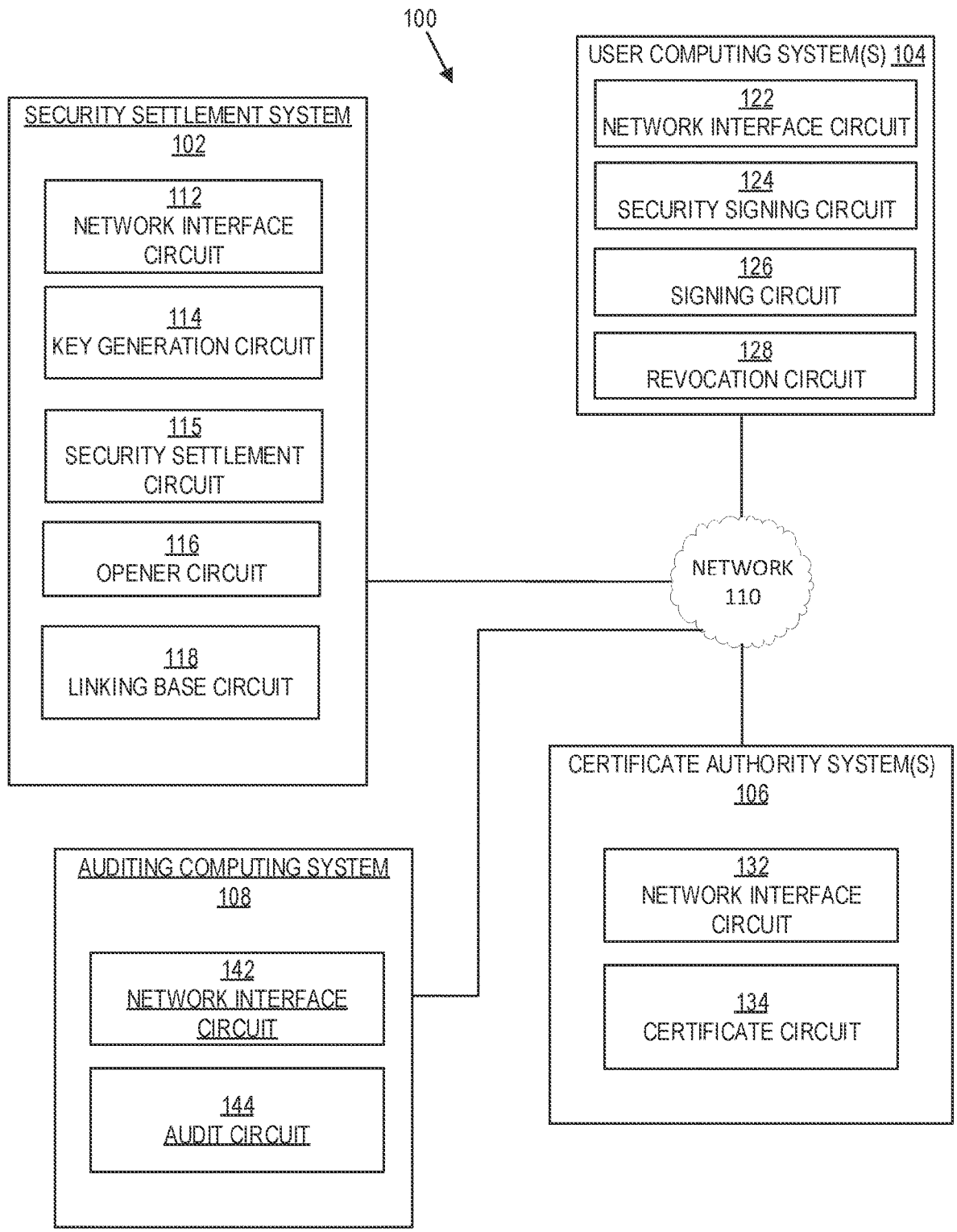
FIG. 1 is a schematic diagram of a group payment account environment, according to an example implementation.

Systems and methods are described to provide platforms and systems allowing for settlement of securities. In some implementations, the platforms and/or systems transfer ownership of one or more securities without revealing initial ownership or the ownership of the end owner. In some implementations, ownership or control of a security may be managed by using group membership technology to revoke the signing rights of the seller and adding signing rights to the buyer. Group membership with group signatures allow for one group public key and a plurality of private keys, where each private key is associated with a group member. Signatures create by different group members are indistinguishable to verifiers but a group manager is able to determine which member has signed, link member signatures, implement controls and/or limits, and revoke and add signatory capability when needed. In some implementations, revocation of signatory capability is done with the cooperation of a Digital Certificate Authority.

In some implementations, one or more securities may be held by a custodian. The custodian may put the one or more securities in the name of a nominee for registration purposes. The custodian may use anonymous names for members. In some implementations, the custodian may further be the group manager with the ability to revoke and add signatory capability as needed to affect the transfer of securities. In some implementations, a group manager may give control to a custodian to trade securities without revealing the name of the seller, buyer, and/or end owner. Group members associated with a group manager may include both buyers and sellers of securities. In some implementations, a group manager manages a plurality of groups. In some implementations, each group managed by a group manager may be associated with one or more securities and ownership of the one or more securities is managed by transferring signing right. In some implementations, transferring signing right is accomplished by revoking signing capability of a seller and adding signing capability of a buyer. In some implementations, group signatures allow for one group public key and a plurality of private keys, where each private key is associated with a group member. Signatures created by different group members are indistinguishable to verifiers but the group manager is able to determine which member has signed, link member signatures, and implement controls and limits. Controls and limits may include revocation of a member from signing. In some implementations, identification of a signer as belonging to a particular group or having a particular status or position is accomplished by adding an appropriate identifier in the group public key certificate. In some implementations, identification of a signer as belonging to a particular group or having a particular status or position is accomplished by unlocking a group member by the group manager.

Digital certificates are used by business and organizations to authenticate the identities of devices, employees, business partners, and regulators. Cryptographic keys associated with digital certificates may be used to sign ordinary email, create electronic signatures that comply with ESIGN and Uniform Electronic Transactions Act (UETA) requirements, sign transactions or smart contracts in blockchain and distributed ledger technology (DLT) environments, or enable entity authentication. Group signatures are anonymous digital signature mechanisms in which a relying party uses a single group public key to verify the digital signatures of all group members, while each group member has their own distinct, private signing key. The present disclosure may relate to an extension of a group certificate that allows group users to conduct anonymous transactions in public, with the ability to subsequently audit and confirm signer identity. Further discussion of the group certificate extension may be found in application Ser. No. 16/429,629 which is incorporated herein in its entirety by reference. Auditing and confirmatory functions of the group manager may include group signature openers that are configured to reveal the identity of a signer that is a member of a group by their signature. Auditing and confirmatory functions of the group manager may also include group signature linkers that are configured to link two signatures (i.e., signed data) to the same signer using a linking key or linking base. In some implementations, regulators may contact the group manager through analysis of the group certificate extension for access to opening or linking functionality. Auditing may be required specifically due to the transaction of securities.

In some implementations, in a group payment account environment each member of the group has a public and private key pair. The group manager may create the security parameters related to the group and may issue the group public key and work with each member of the group in the creation of their respective private key. The creation of each respective private key may be an iterative process with where each private key is created to work with an already generated group public key. The end result is each group member ends up with each group's own assigned private key paired with the one public key.

In some implementations, security settlement using group signatures facilitates anonymous transfer of security ownership in a group environment while still allowing for regulatory control. For example, in a distributed ledger or blockchain environment, when any members of a group may be signing data, security settlement using group signatures allows for regulators with appropriate authority to contact a group manager for opening or linking functionality. In some implementations, this may be accomplished by a group certificate extension as discussed above. This may break the anonymity or partial anonymity (e.g., where one knows that someone in a group signed data but not the particular person out of a group of members or former members that have had their membership revoked as part of security settlement) of the transaction in appropriate circumstances. The regulators may contact the group manager for access to the opening or linking functionality. In some implementations, using linking functionality, partial anonymity is still preserved as the only information provided is that two or more signatures are linked without revealing the particular signer in the group.

In some implementations, the group manager security settlement can be used to perform revocation or blacklisting of one or more members of a group as part of the security settlement. For example as part of a blockchain notary or other entity that is configured to decide whether or not the data can be posted to the blockchain and provide a time stamp service and verification of the digital signature. In some implementations, where the group manager and a Digital Certificate Authority are the same entity, a notary node can perform the blacklisting or similarly use a revocation list (e.g., a Certificate Revocation List (CRL)) for managing signing behavior of group members or former group members. These blacklists may include Certificate Revocation Lists (CRLs) issued by the Digital Certificate Authority or using the Online Certificate Status Protocol (OCSP).

In some implementations, the group signature extension solves a technical problem of maintaining anonymity or partial anonymity but allowing for auditing and regulatory functions in applications where it is necessary to prevent duplicate transactions. For example, applications such as security settlement where it is necessary to detect or prevent sellers from transferring ownership of the same security twice. The group manager may be able to open a signature signed by a group member by showing which group member created it, where otherwise the signatures would be indistinguishable to those verifying the signature but would in some circumstances have to be audited or regulated. In other words, the group manager may have a secret master key which can be used to extract the identity of the group member from a given signature instance. This may provide the property of signer traceability, sometimes referred to as traceable signatures. Given a group signature instance, no one that is without possession of the secret master key held by the group manager can determine which group member (or former group member) was the signer. Similarly, in some implementations, the group manager may be able to link two signatures signed by the same signer where otherwise the signatures would be indistinguishable to those verifying the signature but would in some circumstances have to be audited or regulated.

Referring to FIG. 1, a schematic diagram of a group payment account environment 100 is shown, according to an example implementation. The group payment account environment 100 comprises a security settlement system 102, one or more user computing system(s) 104, one or more certificate authority system(s) 106, one or more auditing computing system(s) and a network 110. Each of the security settlement system 102, one or more user computing system(s) 104, one or more certificate authority system(s) 106 and one or more auditing computing system(s) 108 may be in operative communication with one or more of the others via the network 110. The network 110 may include, for example, the Internet, cellular networks, proprietary banking networks, and the like.

Generally, the security settlement system 102 is used to manage membership, privacy, key generation of a plurality of digitally signed data, and receipt of requests to settle one or more securities. Although various implementations may be described in connection with example systems and methods, it should be understood that the systems and methods described herein may similarly be used to provide a security settlement system in undescribed types of systems and methods, such as enterprise security and other types of systems. In some implementations, the security settlement system 102 may also be configured to communicate with or function as a Certificate Authority (i.e., will also be configured to function as certificate authority system 106) to obtain and/or validate digital certificates or to issue and validate digital certificates. While the security settlement system 102, one or more user computing system(s) 104, and one or more certificate authority system(s) 106 are shown as separate entities in FIG. 1, in some implementations a respective system may perform some or all of the functions of one of the other systems. For example, in some implementations, the security settlement system 102 may perform some or all of the functions of the certificate authority system 106. In another example, the certificate authority system 106 may perform one or more of the functions of the security settlement system 102. In some implementations, the user computing system 104 performs some of or all of the functions of the security settlement system 102 (e.g., the functions of the key generation circuit 114).

The security settlement system 102 includes a network interface circuit 112, a key generation circuit 114, a security settlement circuit 115, an opener circuit 116, and a linking base circuit 118. Generally, the security settlement system 102 is structured to generate or facilitate generating group keys for signing data. The security settlement system 102 may, for example, include one or more servers each with one or more processors configured to execute instructions stored in a memory, send and receive data stored in the memory, and perform other operations to implement use of group payment account functions and related functions as described herein. The network interface circuit 112 is structured to facilitate operative communication between the security settlement system 102 and other systems and devices over the network 110.

The security settlement system 102 may comprise a key generation circuit 114. In some implementations, the key generation circuit 114 is configured to generate a public and private key pair, wherein the public key is the group public key. The key generation circuit 114 may also be configured to enroll members in the group. Enrolling members may including deriving and/or helping to derive their respective private key. In some implementations, the creation of each respective private key may be an iterative process where each private key is created to work with the already generated group public key. The end result is each group member ends up with their own assigned private key paired with the one group public key. Each respective private key is derived to work with established security parameters set by the group manager and the issued public group certificate. In some situations, there may be only one un-revoked group member a time as a sole owner of one or more securities associated with the group membership.

The security settlement system 102 may comprise a security settlement circuit 115. In some implementations, the security settlement circuit 115 is configured to receive and generate communication to, including requests to settle one or more securities, (e.g., by using network interface circuit 112) to a member of a group (e.g., to a user computing system 104). In some implementations, security settlement circuit 115 is configured to determine when a request to settle one or more securities is received and a further determination made whether the request to purchase is properly formatted and signed. For example, a request to transfer ownership of a security may be signed with a private group signature and accompanied by a digital certificate indicating membership in a group associated with the security. The request to purchase may be signed with a private key and sent with a public key allowing for verification that the signer belongs to a group associated with the security. The request to settle a security may also be accompanied by information regarding which group associated with one or more securities the sender belongs to. In some implementations, security settlement circuit 115 is further configured to verify that the signature associated with the request for purchase matches the information regarding which group the sender belongs to. In some implementations, security settlement circuit 115 is configured to verify a digital certificate associated with the signature.

In some implementations, the security settlement circuit 115 is configured to issue group public keys and issue associated private keys. In some implementations, security settlement circuit 115 is configured to generate public and private keys for various groups associated with ownership of one or more securities. In some implementations, security settlement circuit 115 is configured to request an associated group public key certificate from a Certificate Authority.

In some implementations, the security settlement circuit 115 is configured to identify whether received, signed data has been signed with a revoked private signature. In some implementations, the security settlement circuit 115 may be configured to open a signature (e.g., using opener circuit 116) associated with any group signature by showing which group member signed the associated signature or linking two signatures (e.g., using linking base circuit 118) by associating it with the same group member without necessarily revealing the identity of the same group member. The security settlement circuit 115 may be configured to enroll each member of a group associated with one or more securities by deriving their respective private key. The creation of each respective private key may be an iterative process with where each private key is created to work with the already generated group public key. The end result is each group member ends up with their own assigned private key paired with the one public key. In some implementations, some or most group members have a revoked status as ownership or control of the one or more securities changes. Each respective private key is derived to work with any established security parameters and the issued public group certificate. For example, if revoking a membership due to a settlement of one or more securities, the security settlement circuit 115 may be configured to reissue the certificates of all members (including new members) except the revoked member. In some implementations, unrevoked users must update their membership certificates before signing data associated with the one or more securities. In some implementations, the security settlement circuit 115 is configured to perform a revocation of membership for a member of the group, wherein the Certificate Authority is able to check the signature against a revocation list. In some implementations, the security settlement circuit 115 is configured to provide the information necessary to a Certificate Authority to check the signature against a revocation list or blacklist. A secure channel may have to be initiated between the security settlement system 102 and each group member to maintain a secure, managed group. In some implementations, the security settlement circuit 115 is configured to use linear proving complexity in the number of revocations when managing the revocation of members. In some implementations, the security settlement circuit 115 is configured to use accumulators to hash a large set of effective certificates into a short value, where the signer shows that their own certificate is accumulated into the short value. Other methods of revocation of signing capability may be used.

In one implementation, the security settlement circuit 115 is configured to create a functional linkable group signatures associated with security settlements comprising (1) key generation, (2) signing, (3) verification, (4) linking, and (5) revocation. In some implementations, the security settlement circuit 115 is configured to receive signed data. The signed data may be signed using a private key associated with a group signature. The signed data may be associated with one or more securities. In some implementations, the signed data may include or be accompanied by a request to transfer one or more securities or a portion of one or more securities to a buyer. In some implementations, the signed data may be include or be accompanied by contractual details associate with a transfer of ownership of all or part of the one or more securities associated with group membership.

In some implementations, the security settlement circuit 115 is configured to open an identity of a signer of request for settling one or more securities (e.g., by using opener circuit 116). In some implementations, a group manager using the group payment account environment 100 (e.g., using security settlement system 102) has the ability to open a signature signed by a group member by identifying the member of the group that signed the request settlement of one or more securities. While signatures that are created by different group members are indistinguishable to a verifier of the digital signature, they are not indistinguishable to the group manager (e.g., a group manager using security settlement system 102 and the opener circuit 116) who may be able to disclose the identity of any member of the group. In some implementations, opener circuit 116 is configured to use a secret master key associated with the group that can be used to extract the identity of the signing group member. In some implementations, a group manager using the group payment account environment 100 (e.g., using security settlement system 102) has the ability to link a signature signed by a group member to other received, signed request for purchase. While signatures that are created by different group members are indistinguishable to a verifier of the digital signature, a linking base circuit (e.g., linking base circuit 118) may be configure to link different signatures together to identify a plurality of request for purchase that is linked to the same member of a group without revealing the identity of the group member.

The security settlement system 102 may comprise an opener circuit 116. In some implementations, the opener circuit 116 is configured to open a signature signed using a group signature by identifying the member of the group that signed the data. While signatures that are created by different group members are indistinguishable to a verifier of the digital signature, they are not indistinguishable to a computer system controlled by a group manager who can disclose the identity of any member of the group. In some implementations, the security settlement system 102 is configured with a secret master key that can be used to extract the identity of the signing group member. This capability provides the property of signer traceability, in what is are sometimes referred to as 'traceable signatures.' No computing system that is not configured to use the secret master key (e.g., a system other than a security settlement system 102 configured with a secret master key) should be able to determine which group member was the signer.

The security settlement system 102 may comprise a linking base circuit 118. In some implementations, the linking base circuit 118 is configured to link two or more received signatures as being signed by the same group member without revealing the identity of the group member. The two or more signatures may be linked using a linking key or linking base. The linking base circuit 118 may further be configured to execute a linking process that is able to take two valid, linkable signatures signed using a group signature scheme and determine if they are linked. In other words, that they have been signed by the same member of the group. In some implementations, linking outputs a value of '1' if the signatures are linked and a value of '0' if the signatures are not linked.

The user computing system 104 may include a network interface circuit 122, a security signing circuit 124, a signing circuit 126, and a revocation circuit 128. Generally, the user computing system 104 structured to help create private keys for joining a group and sign data if ownership of one or more securities or a portion of one or more securities associated with the group has passed to them. The user computing system 104 may, for example, include one or more processors configured to execute instructions stored in a memory, send and receive data stored in the memory, and perform other operations as part of the group payment account environment 100. The network interface circuit 122 is structured to facilitate operative communication between the user computing system 104 and other systems and devices over the network 110.

The user computing system 104 may comprise a security signing circuit 124. In some implementations, the security signing circuit 124 is configured to join a new member, if authorized, using the user computing system 104 to a group by deriving a respective private key for the new group member that is associated with the extant public group key. Further, the security signing circuit 124 may be configured to join the group members by deriving a respective private key. In some implementations, the security signing circuit 124 may be configured to execute a joining portion of an iterative process where the respective private key for the newly joining group member is created by sending a random number by the security signing circuit 124 to a system that determines whether the private key thus created will work with an already generated group public key. The security signing circuit 124 may thus be configured such that it receives a respective, assigned private key paired with the one group public key. The security signing circuit 124 may be configured to derive each respective private key to work with the established security parameters associated with the group and the issued public group certificate.

Figure 4:
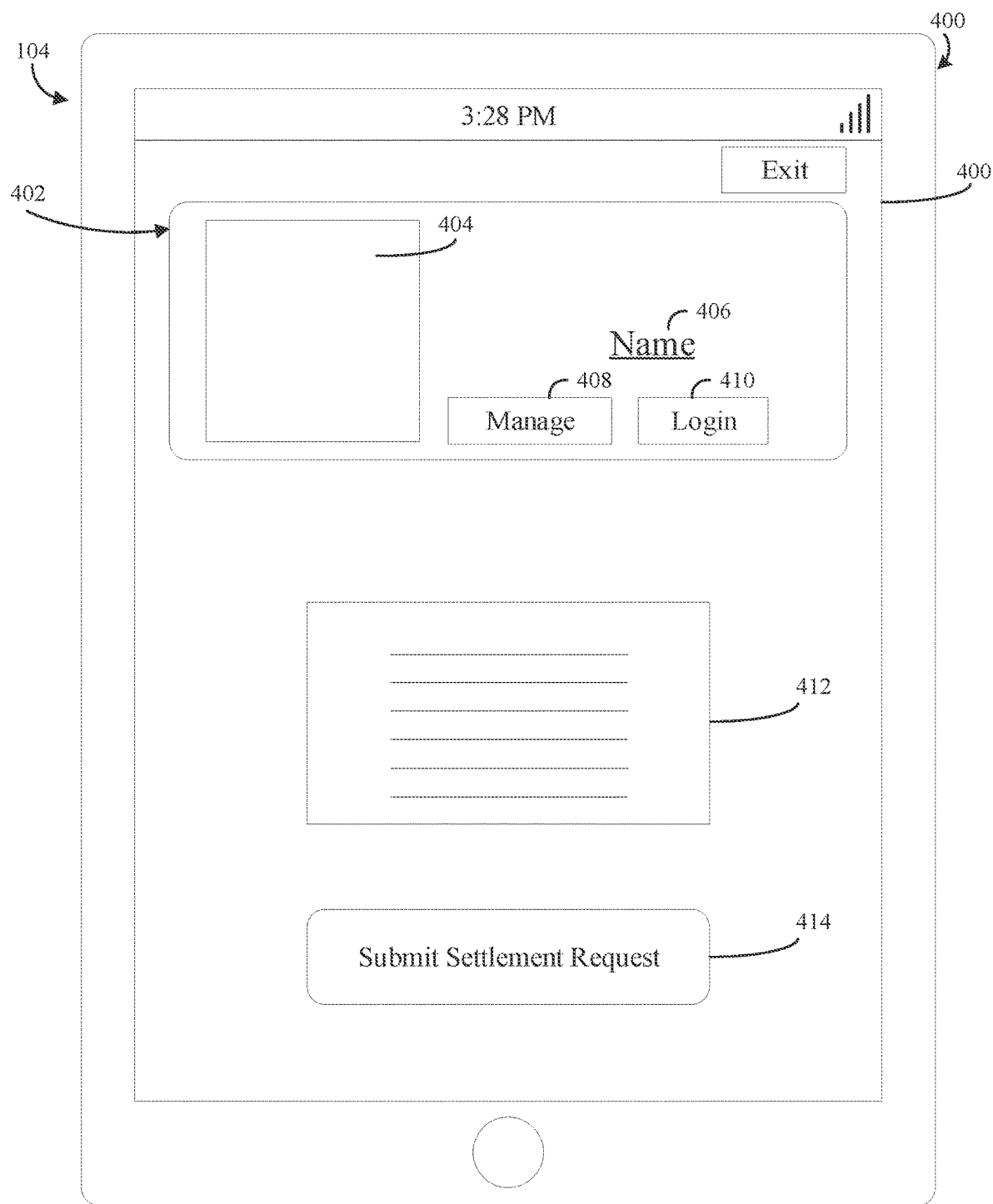
FIG. 4 is a schematic diagram of a graphical user interface for submitting a request to transfer ownership of a security according to an example implementation.

The user computing system 104 may comprise a signing circuit 126. In some implementations, the signing circuit 126 is configured to digitally sign data using a private key of a group member associated with a particular group associated with one or more securities with the respective user computing system 104. The signing circuit 126 may also be configured to send a request for a digital certificate associated with the private key of the group member. In some implementations, a user may access the signing circuit 126 through a graphical user interface on the user computing system 104 (e.g., a graphical user interface as illustrated in FIG. 4).

The user computing system 104 may comprise a revocation circuit 128. In some implementations, the revocation circuit 128 is configured to revoke the ability of the user to sign using their private key associated with the group public key. In some implementations, a user may access the revocation circuit 128 through a graphical user interface on the user computing system 104 (e.g., a graphical user interface as illustrated in FIG. 4). In some implementations, a user (e.g., using a graphical user interface 400) may ask to be revoked. In some implementations, an administrator may instead ask for a user to be revoked. The user may be fully revoked such that all signed data by the user is no longer verifiable or partially revoked such that data signed by the user going forward is no longer verifiable.

The certificate authority system 106 includes a network interface circuit 132 and a certificate circuit 134. The certificate authority system 106 may, for example, include one or more servers each with one or more processors configured to execute instructions stored in a memory, send and receive data stored in the memory, and perform other operations to implement the services described herein associated with the processing modules, databases, and processes. In some implementations, the certificate authority system 106 is configured to issue digital certificates. In one example, a digital certificate may certify the ownership of a public key by the named subject of the certificate. In some implementations, the format of these certificates may be specified by the X.509 standard. The network interface circuit 132 is configured to facilitate operative communication between the certificate authority system 106 and other systems and devices over the network 110. In some implementations, underlying signing mechanisms are based on cryptographic techniques that can be automated.

The auditing computing system 108 may include a network interface circuit 142 and an audit circuit 144. Generally, the auditing computing system 108 is structured to validate digitally signed data (i.e., signatures). The auditing computing system 108 may, for example, include one or more processors configured to execute instructions stored in a memory, send and receive data stored in the memory, and perform other operations as part of the group payment account environment 100. The network interface circuit 142 is structured to facilitate operative communication between the auditing computing system 108 and other systems and devices over the network 110.

The auditing computing system 108 may comprise an audit circuit 144. In some implementations, the audit circuit 144 is configured to analyze a group certificate extension of a digital certificate associated with signed data to identify a value associated with the extension identifying a group manager. The audit circuit 144 may further determine whether the group certificate extension is designated as critical or non-critical. For example, the audit circuit 144 may be configured to determine the group certificate extension is designated as critical and further identifies a group manager identifier (e.g., a uniform resource identifier (URI)) associated with who is managing the group. The audit circuit 144 may be configured to send to the group manager a request to open a signature associated with one of the group signatures or link two or more signatures including the signature that may be associated with one of the group signatures. In some implementations, the audit circuit 144 is associated with a regulator with appropriate authority associated with securities and/or security settlement to contact the group manager for opening or linking functionality. In some implementations, an opener or linker is contacted directly through an identifier or other contact information available in the group certificate extension. In some implementations, this breaks the anonymity or partial anonymity (i.e., where one knows that someone in a group signed data but not the particular person) of the securities transaction in appropriate circumstances.

Figure 2:
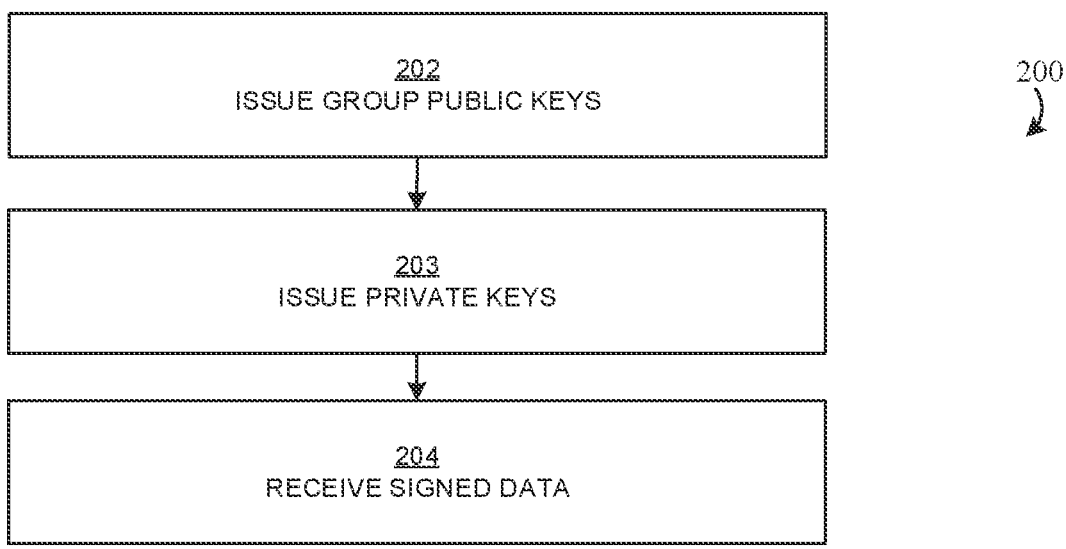
FIG. 2 is a flow diagram of a method of managing an action associated with group membership according to an example implementation.

Referring to FIG. 2, a flow diagram of a method 200 of managing an action associated with group membership is shown according to an example implementation. In some implementations, method 200 is executed using a security settlement system 102 (e.g., a key generation circuit 114, a security settlement circuit 115, an opener circuit 116, and/or a linking base circuit 118). In brief, method 200 comprises issuing group public keys, associated private keys, and receiving signed data associated with one or more securities.

The method 200 begins at 202 and 203 with issuing group public keys and issuing associated private keys. In some implementations, a group manager is responsible for generating public and private keys for various groups associated with ownership of one or more securities. For example, a group has a plurality of members and is managed by the group manager, with the adding of group members managed by the group manager. Some or most of the group members may have their signing ability in a revoked status indicating they no longer have controlling ownership over the one or more securities. In some implementations, an associated group public key certificate is requested from a Certificate Authority by a group manager. For example, a group has one or more members and a single manager, all associated with a single signature verification key. A trusted authority (e.g., a Certificate Authority) may establish the group with a public digital certificate associated with the group public key with each group member having their own signing private key with which digital signatures that can be verified using the group public key. In some implementations, the group manager may be able to identify whether the signed data has been signed with a revoked private signature. The group manager may be able to open a signature associated with any group signature by showing which group member signed the associated signature or linking two signatures by associating it with the same group member without necessarily revealing the identity of the same group member. In some implementations, a group manager when creating the group sets some security parameters (e.g., ISO, IC2008 standard group signature parameters). Once security parameters are set the group may be set up through the issuance of a public key for the group and a public digital certificate associated with the public key through a request to a Certificate Authority or self-issuance. Each member of the group may be enrolled by deriving their respective private key. The creation of each respective private key may be an iterative process with where each private key is created to work with the already generated group public key. The end result is each group member ends up with their own assigned private key paired with the one public key. Each respective private key is derived to work with the established security parameters and the issued public group certificate. The issued public group certificate may be issued with an extension (e.g., a group signature extension). The group certificate extension may be analyzed to identify a value associated with the extension identifying the group manager. The group certificate extension may be designated as non-critical. For example, a certificate authority may validate a digital certificate without checking for the extension and/or any data values associated with the extension. In some implementations, the group manager is identified by a uniform resource identifier (URI) that allows for a determination of who is operating the group allowing for a request to be sent to open a signature associated with one of the group signatures or link two or more signatures potentially associated with one of the group signatures. In some implementations, the certificate extension allows for a regulator with appropriate authority to contact the group manager for opening or linking functionality. The certificate extension is discussed in more detail in application Ser. No. 16/429,629 which is incorporated herein in its entirety by reference. In some implementations, the group manager may perform a revocation of membership for a member of the group. For example, the group manager may reissue the certificates of all members (including new members) except the revoked member. In some implementations, unrevoked users must update their membership certificates before signing data associated with the one or more securities. In some implementations where the group manager and the Certificate Authority are the same entity, the group manager may perform a revocation of membership for a member of the group, wherein the Certificate Authority is able to check the signature against a revocation list. In some implementations, the group manager may provide the information necessary to the Certificate Authority to check the signature against a revocation list or blacklist. A secure channel may have to be initiated between the group manager and each group member to maintain a secure, managed group. In some implementations, the group manager uses linear proving complexity in the number of revocations. In some implementations, the group manager relies on accumulators to hash a large set of effective certificates into a short value, where the signer shows that their own certificate is accumulated into the short value. Other methods of revocation of signing capability may be used.

In one implementation, creating a functional linkable group signature comprises (1) key generation, (2) signing, (3) verification, (4) linking, and (5) revocation. The first part (1) of a group manager creating a group signature may comprise key generation. The group manager creates the group public parameters. The group manager executes an issuing process which is executed between the group manager and each group member to create a unique signature key with a private key and a group membership certificate for each group member. In some implementations, the group manager chooses the group public parameters and random generators. Adding a member is an iterative process where the group manager does not know the final result, private key created for the member but the group manager chooses a random prime number and computes a value that the member can check against. The second part (2) of a group manager creating a group signature may comprise the ability of a group member to sign by taking as an input the group member signature key, a linking base, and the data to be signed and outputting a linkable signature. The third part (3) may comprise verification comprising taking a message, a linkable signature, and the group private key corresponding to the group. In some implementations, a value of '1' is returned if the signature is valid and a value of '0' if the signature is not valid. The fourth part (4) may comprise a linking process that is able to take two valid, linkable signatures and determine if they are linked. In other words, that they have been signed by the same member of the group. In some implementations, linking outputs a value of '1' if the signatures are linked and a value of '0' if the signatures are not linked. The fifth part (5) may comprise a revocation part. In some implementations a private key revocation is implemented. In some implementations, a verifier blacklist or a verifier revocation list is implemented. For example, in a verifier revocation list or verifier blacklist implementation, a verifier (i.e., a Certificate Authority) may generate a revocation list or a blacklist where the linking tag of any revoked members is checked against future signatures. In some implementations, if the check fails a value of '0' is outputted (i.e., revoked) and validates if a value of '1' is outputted.

At 204, signed data is received. In some implementations, the signed data is signed using a private key associated with a group signature. The signed data may be associated with one or more securities. In some implementations, the signed data may include or be accompanied by a request to transfer one or more securities or a portion of one or more securities to a buyer. In some implementations, the signed data may be include or be accompanied by contractual details associate with a transfer of ownership of all or part of the one or more securities associated with group membership.

Figure 3:
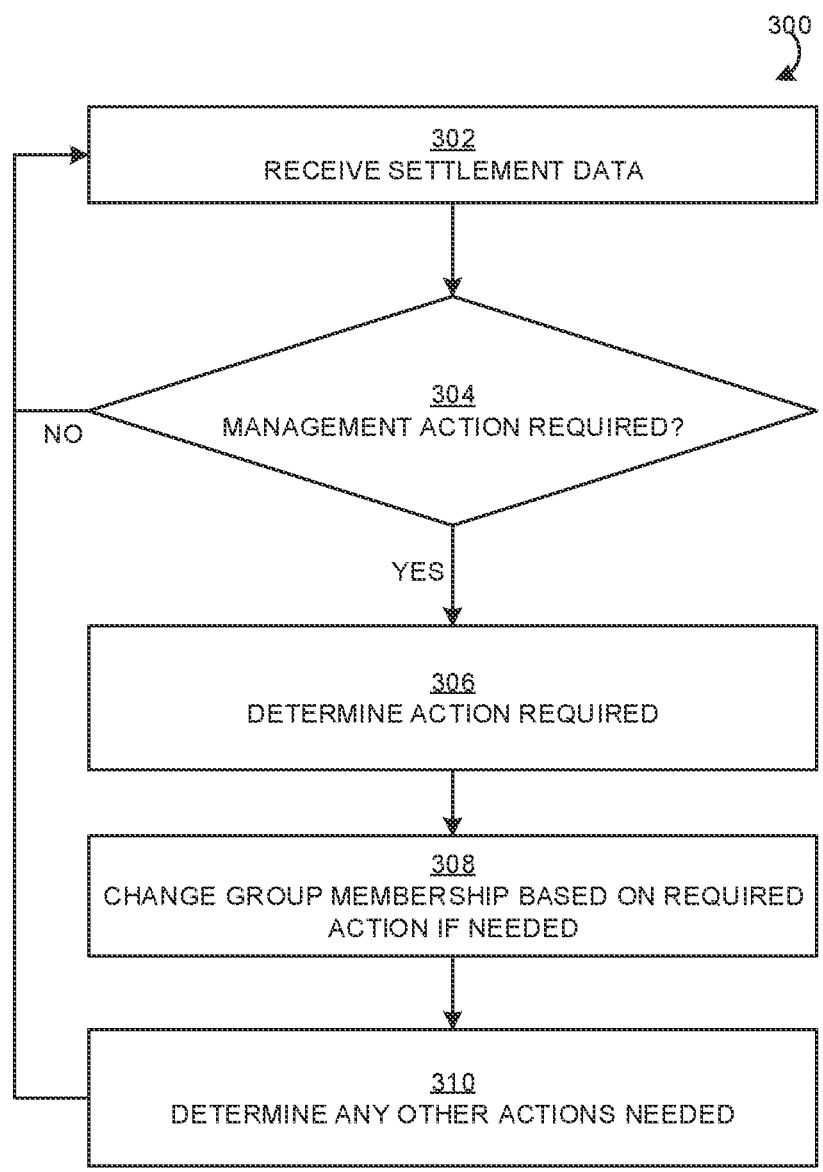
FIG. 3 is a flow diagram of a method of managing a request to transfer ownership of a security according to an example implementation.

Referring to FIG. 3, a flow diagram of a method 300 of managing a request to transfer ownership of a security according to an example implementation. In some implementations, the method 300 is executed using a security settlement system 102 (e.g., a key generation circuit 114 and/or security settlement circuit 115 of a security settlement system 102). In brief, method 300 comprises receiving settlement data and determining if management action is required. If management action is required, the action required is determined, a group member may be changed based on the required action if needed, and a determination is made if any other actions are needed.

Still referring to FIG. 3 and in more detail, at 302, settlement data is received. The settlement data may be related to a settlement of one or more securities. In some implementations, the one or more securities are delivered as part of the securities settlement as part of addition of and revocation of signing ability of a group signature associated with the one or more securities. In some implementations, the data may be associated with one or more members of the group with signing capability of the group signature associated with the one or more securities. The data may be associated with a request to remove a member or add a member to the group as part of the settlement. The data may be a request to add an individual to a group associated with a previously generated group public key associated with the one or more securities. The data may also be accompanied by additional data providing support for evidence that an individual being added as having signing ability for the group signature should be considered to be a new owner of the one or more securities associated with the group signature. The data may also include a request to revoke group membership of one or more members of the group. For example, if the one or more members of the group are selling or relinquishing ownership of the one or more securities associate with the group signature. In some implementations, the data may also include a request to revoke membership of all members of the group and/or dissolve the group. For example, if the one or more securities are no longer being settled by membership in a group signature. In some implementations, the data related to the group may be information related to revocation of ownership and/or control of the one or more securities due to improper, malicious, or unlawful activity related to one or more group members that may prompt further action by the group manager.

At 304, a determination is made if management action is required and what action is required at 306. In some implementations, a management action may be the addition of an individual to a group membership to be associated with a previously generated group key. For example, a new owner or other individual otherwise to be given ownership and/or control of the one or more securities is added to the group membership. In some implementations, a management action may be the revocation of group membership from a member of a group or a revocation of an available capability from a member of the group. For example, a previous owner or other individual otherwise to lose ownership and/or control of the one or more securities is removed from the group membership. The action required may be a creation or update of a blacklist or revocation list. In some implementations, the action required may be to revoke the entire group, revoke a single group member, or modify or remove specific signing capabilities of one or more members of the group. Where the action is being done by the Certificate Authority, the management action may be incorporated directly into a Digital Certificate validation or verification functionality of the Certificate Authority. Where the action is being done by a management system that is not the Certificate Authority (e.g., a security settlement system 102), the action may comprise sending instructions or an update to a Certificate Authority. The instructions or update may be signed or comprise other verification of the authority of the sender to make the requested changes.

At 308, a group membership may be changed based on the required action if needed. In some implementations, one or more group members may be added based on the determination of what action is required. In some implementations, the addition of an individual to a group membership to be associated with a previously generated group key. In some implementations, revocation of membership is done by a verifier blacklist or verifier revocation list. For example, in a verifier blacklist or verifier blacklist implementation, a verifier (i.e., a Certificate Authority) may generate a blacklist where the linking tag of any revoked members is checked against future signatures. In some implementations, if the check fails a value of '0' is outputted (i.e., revoked) and validates if a value of '1' is outputted. In some implementations, the blacklist or an update to the blacklist is transmitted to one or more Certificate Authorities that generate and/or verify digital certificates with the group certificate extension. In some implementations, the group manager may function as the Certificate Authority. Up to three levels of revocation may be performed, for example, the entire group may be revoked, a single group member may be revoked, or specific signing capabilities of one member may be revoked. In some implementations, a user (e.g., using the graphical user interface 400) may ask to be revoked.

In some implementations, an administrator may instead ask for a user to be revoked. In some implementations, application of the rules and/or parameters stems from a received request to open an identity of the signer. In some implementations, application of the rules and/or parameters stems from a received request to link an identity of the signer. Requests may, in some circumstances come from regulators with appropriate authority to contact a group manager for opening or linking functionality. In some implementations, this breaks the anonymity or partial anonymity (i.e., where one knows that someone in a group signed data but not the particular person) of the transaction in appropriate circumstances. In some implementations, using linking functionality, partial anonymity is still preserved as the only information provided is that two or more signatures are linked without revealing the particular signer in the group.

At 310, a determination is made if any other actions are needed. In some implementations, addition of a group member or a revocation action may lead to other actions that need to be executed. Other actions may include, transmitting a notification that the group member has been added to the group or that a revocation of group membership has occurred. For example, in a group membership where there are a plurality of group members who are co-owners of one or more securities, the remaining group members are notified that a group member has been added to the group or that a revocation of a group membership has occurred. In some implementations, the initiation of generating a private key associated with the relevant group public key may commence as described above. In the event of an addition or revocation of group membership, the notification may include details on why there is an addition or a revocation. For example, contractual details associated with a transfer of ownership of all or part of the one or more securities associated with group membership.

Referring now to FIG. 4, the graphical user interface 400 on a display of a user computing device (e.g., user computing system 104), including a graphical user interface for submitting requests for security settlement, is shown according to an example implementation. In some implementations, the graphical user interface 400 and/or any generated information and/or generated private or public key values or associated values affecting an appearance of the graphical user interface 400 is provided by a security settlement system (e.g., a security settlement circuit 115 of a security settlement system 102). The graphical user interface 400 may include information relating to various applications related to sending a request associated with signed data signed with a signature (e.g., a private signature of a group signature) associated with one or more securities. An identifying profile may be provided by the security settlement system 102. A profile area 402 of the graphical user interface 400 may include information relating to the individual user, including a profile picture 404 and a user name 406. The profile picture 404 and user name 406 may be selected by the user. A user may be able to access a list of groups they are a member of by interacting with buttons 408 and 410 respectively. In some implementations, accessing a list of groups they are a member of is equivalent to accessing information on the securities that are owned and/or controlled. Various information related to group membership and current status may be displayed from within the graphical user interface 400. In some implementations, a text area 412 may allow for entry of text associated with a request for security settlement to be sent. In some implementations one or more display areas may be present on the graphical user interface 400, on pop-up screens, or additional screens of the graphical user interface 400 (not shown) and used to display any applicable information associated with logging in to a particular group membership, generating an associated private key while joining a group (e.g., acquiring a security), sending a request to purchase a security, receiving confirmation of a successful joining of a group or revocation from a group, and the like. Other implementations of the graphical user interface 400 for settling securities associated with a group signature, generating and sending a request for settlement and receiving confirmation may contain similar features.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the implementations might include a general purpose computing computers in the form of a computer, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and arrangement of the implementations without departing from the scope of the present disclosure as expressed in the appended claims.

What is claimed:

1. A system comprising:
one or more processors configured to:
receive, from a first user computing system, data comprising a request for transferring ownership of a portion of a security, wherein a portion of the data is signed by a signer with a group signature, the group signature comprises an extension, the extension links an identity of the signer,
receive, from a computing system through the extension, a request to link the identity of the signer,
open the identity of the signer,
provide, to the computing system, information corresponding to the group signature and a signature of a transferee being linked to the group signature, wherein the transferee is a second user;
revoke signing ability of the signer to use the group signature by adding an identifier of the signer to a revocation list, and
generate signing ability of the second user computing system associated with an identifier of the transferee allowing the second user computing system to sign new data using the group signature,
wherein generating the signing ability of the second user computing system to use the group signature transfers the ownership of the portion of the security to the second user.

2. The system of claim 1, wherein the one or more processors further configured to send the identifier of the signer to a Certificate Authority associated with the revocation list.

3. The system of claim 1, wherein the one or more processors further configured to revoke signing ability of the signer to use the group signature by updating membership certificates of one or more unrevoked group members associated with the group signature.

4. The system of claim 3, wherein the one or more processors further configured to transmit updated membership certificates of the one or more unrevoked group members to respective user computing systems associated with the one or more unrevoked group members.

5. The system of claim 1, wherein the one or more processors further configured to be part of a Certificate Authority, the one or more processors further configured to add an identifier of the signer to a revocation list.

6. The system of claim 5, the one or more processors further configured to receive a request for a digital certificate associated with signed data signed using the group signature and checking an identifier associated with the signed data against the revocation list.

7. A method, executing on a system, the method comprising:
receiving, from a first user computing system, data comprising a request for transferring ownership of a portion of a security, wherein a portion of the data is signed by a signer with a group signature, the group signature comprises an extension, the extension links an identity of the signer;
receiving, from a computing system through the extension, a request to link the identity of the signer;
opening the identity of the signer;
providing, to the computing system, information corresponding to the group signature and a signature of a transferee being linked to the group signature, wherein the transferee is a second user;
revoke signing ability of the signer to use the group signature by adding an identifier of the signer to a revocation list, and
generating signing ability of the second user computing system associated with an identifier of the transferee allowing the second user computing system to sign new data using the group signature,
wherein generating the signing ability of the second user computing system to use the group signature transfers the ownership of the portion of the security to the second user.

8. The method of claim 7, further comprising sending the identifier of the signer to a Certificate Authority associated with the revocation list.

9. The method of claim 7, further comprising revoking signing ability of the signer to use the group signature by updating membership certificates of one or more unrevoked group members associated with the group signature.

10. The method of claim 9, further comprising transmitting updated membership certificates of the one or more unrevoked group members to respective user computing systems associated with the one or more unrevoked group members.

11. The method of claim 7, further comprising adding an identifier of the signer to a revocation list, wherein the system is part of a Certificate Authority.

12. The method of claim 11, further comprising receiving a request for a digital certificate associated with signed data signed using the group signature and checking an identifier associated with the signed data against the revocation list.

13. A non-transitory computer-readable storage media storing instructions that are executable by one or more processors to perform operations comprising:
receiving, from a first user computing system, data comprising a request for transferring ownership of a portion of a security, wherein a portion of the data is signed by a signer with a group signature, the group signature comprises an extension, the extension links an identity of the signer;

receiving, from a computing system through the extension, a request to link the identity of the signer;

opening the identity of the signer;

providing, to the computing system, information corresponding to the group signature and a signature of a transferee being linked to the group signature, wherein the transferee is a second user;

revoke signing ability of the signer to use the group signature by adding an identifier of the signer to a revocation list, and generating signing ability of the second user computing system associated with an identifier of the transferee allowing the second user computing system to sign new data using the group signature, wherein generating the signing ability of the second user computing system to use the group signature transfers the ownership of at least the portion of the security to the second user.

14. The non-transitory computer-readable storage media of claim 13, the operations further comprising sending the identifier of the signer to a Certificate Authority associated with the revocation list.

15. The non-transitory computer-readable storage media of claim 13, the operations further comprising revoking signing ability of the signer to use the group signature by updating membership certificates of one or more unrevoked group members associated with the group signature.

16. The non-transitory computer-readable storage media of claim 15, the operations further comprising transmitting updated membership certificates of the one or more unrevoked group members to respective user computing systems associated with the one or more unrevoked group members.

17. The non-transitory computer-readable storage media of claim 13, the operations further comprising adding an identifier of the signer to a revocation list, wherein a system is part of a Certificate Authority.

* * * * *